United States Patent Office 2,839,544
Patented June 17, 1958

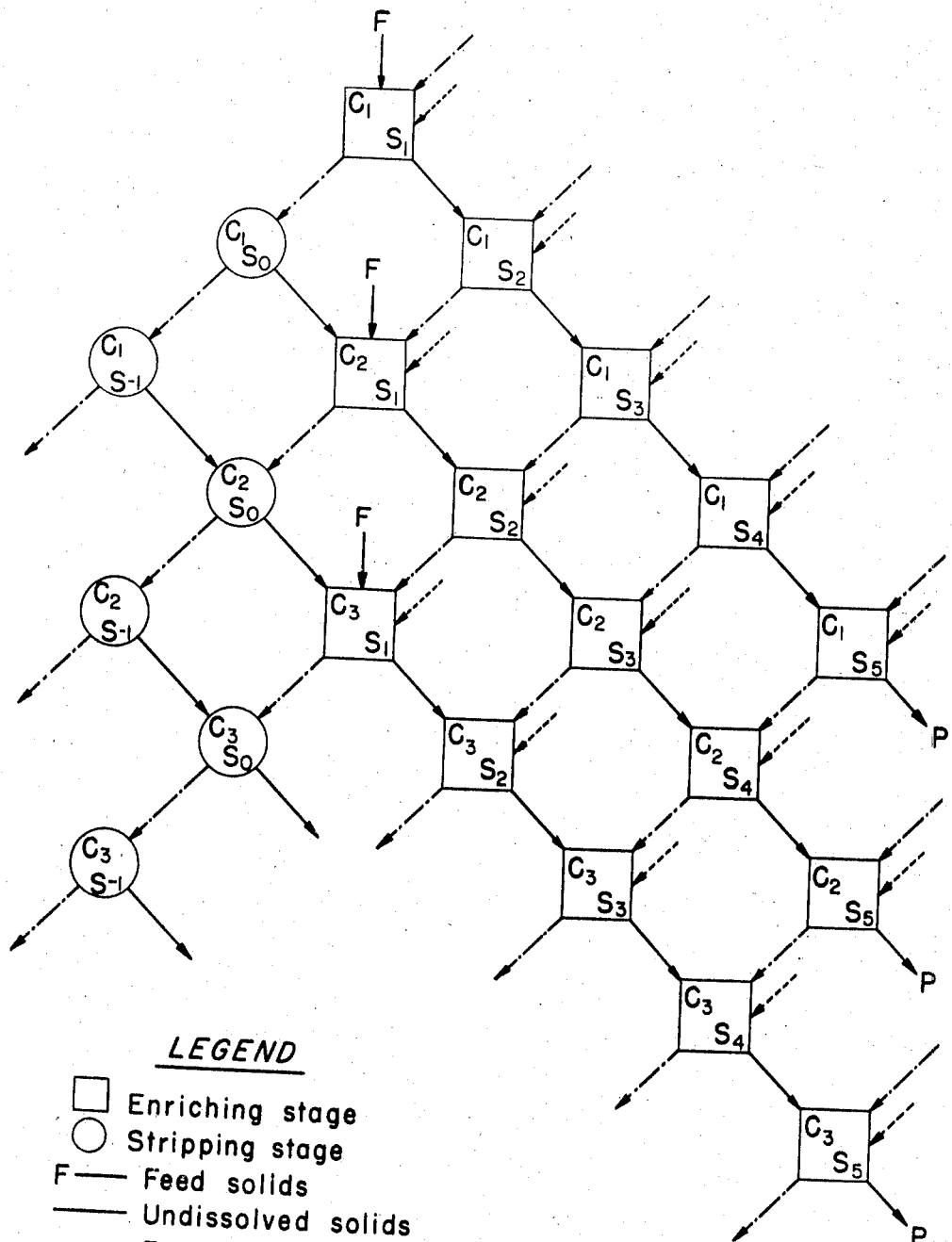

2,839,544

COUNTERCURRENT EXTRACTION OF STEROIDS

John W. Greiner, Kalamazoo Township, Kalamazoo County, and Glen A. Fevig, Kalamazoo, Mich., assignors to The Upjohn Company, Kalamazoo, Mich., a corporation of Michigan Application September 4, 1956, Serial No. 607,854

18 Claims. (Cl. 260—397.25)

This invention relates to a novel process for the countercurrent selective extraction of sterols.

It is an object of the present invention to provide a process for the countercurrent selective extraction of sterols. Another object of the present invention is to provide a countercurrent extraction process for the production of sterols of enriched stigmasterol content. Another object is the provision of a process for the production of sterols of enriched stigmasterol content with a high recovery of the stigmasterol. A further object is the provision of a process for the production of high purity stigmasterol from a mixture thereof with sitosterols. Other objects will be apparent to those skilled in the art to which this invention pertains.

According to the present invention, a solid mixture consisting essentially of stigmasterol and sitosterols is subjected to countercurrent selective extraction with a selective organic solvent, as further defined hereinafter.

Reference is made to the accompanying drawing which illustrates three cycles of a batchwise countercurrent extraction employing five enriching stages and two stripping stages in each cycle. In the drawing, the enriching stages are shown as squares and the stripping stages as circles. Each portion of the starting mixture is shown as F, the feed solids.

An enriching stage is a point in the process where a selective extraction is conducted, i. e., the chosen solvent is mixed with the sterol solids to partially dissolve these solids and the undissolved solids are then separated from the solvent and dissolved solids (mother liquor). The first enriching stage is shown as $S_1$ in the drawing and the fifth as $S_5$.

A stripping stage involves the separation (stripping) of a portion of the solids, dissolved in the mother liquor obtained from one of the preceding stages, from the mother liquor. The process in the drawing represents two stripping stages, the first employing the mother liquor obtained from the first enriching stage of that cycle and the second employing the mother liquor obtained from the first stripping stage of that cycle. The first stripping stage of each cycle is shown as $S_0$ in the drawing and the second as $S_{-1}$.

A cycle refers to a segment of a countercurrent extraction wherein a portion of the starting mixture, enriched in stigmasterol, is obtained at one end of the system as undissolved solids, and the portion depleted in stigmasterol, dissolved in the spent solvent, is obtained at the other end. In the process shown in the drawing, a cycle is composed of two stripping stages and five enriching stages. The stages of the first cycle are shown bearing the symbol $C_1$; of the second cycle, $C_2$; and of the third cycle, $C_3$. Thus the first enriching stage of the first cycle is shown in the drawing as $C_1S_1$; the first stripping stage of the second cycle, as $C_2S_0$; the second stripping stage of the third cycle as $C_3S_{-1}$, etc.

The starting mixtures for the process of the present invention are solid mixtures consisting essentially of stigmasterol and sitosterols. Stigmasterol is a naturally occurring sterol known to be useful in the production of hormones and other steroids, e. g., progesterone, androsterone, dehydroepiandrosterone, etc., which steroids have been converted to the sex and adrenal cortical hormones, e. g., cortisone, hydrocortisone, testosterone, desoxycorticosterone, etc. (See U. S. Patents 2,379,832, 2,554,986, 2,601,287, 2,623,052, 2,668,816, etc.) Sitosterol has also been indicated to be useful as a solubilizer for physiologically active steroids (U. S. 2,675,342) and can be converted into various products including 17-keto steroids by oxidation with chromic acid.

Stigmasterol and the sitosterols commonly occur together as a mixture obtained from various natural sources, e. g., from soybeans, sugar cane, calabar and coffee beans, etc. Stigmasterol ordinarily comprises only from about five to about 35 percent of the total crude sterols from these sources, the remainder being mostly sitosterols. For this reason, chemical reactions directed toward the conversion of stigmasterol to, for example, progesterone, cannot practicably be employed on the crude sterolic mixtures containing stigmasterol obtained from nature because of the preponderance of sitosterols in these mixtures. It is well known that sitosterols are not converted to the physiologically active steroids by the same chemical routes currently known to convert stigmasterol to these steroids.

Chemical processes have been developed for the separation of stigmasterol from the sitosterols. These processes, however, are complicated and relatively inefficient. Windaus and Hauth, Ber., 39, 4378 (1906), developed a technique of separating stigmasterol from the sitosterols by converting the mixtures to their acetates, brominating the double bonds of this mixture of acetates, separating the less soluble stigmasteryl acetate tetrabromide, debrominating the separated stigmasteryl acetate tetrabromide and finally saponifying the stigmasteryl acetate to produce stigmasterol. That process, in addition to being quite complicated, time consuming, relatively costly and employing undesirable reagents, is relatively inefficient in the amount of stigmasterol which is recovered. It has been shown by Neu and Ehrbacher [Archiv der Pharmazie, 283/55, pages 227–238 (1950); C. A., 45, 3122 (1951)], that high recoveries of stigmasterol cannot be expected from that method. In fact, only about forty percent of the stigmasterol is usually recovered.

Attempts to improve the Windaus method have been made. A modification of the Windaus process (U. S. 2,520,143) involves the oxidation of the brominated steryl acetate mixture to oxidize the side-chain saturated sitosterols, prior to the removal of the halogen and the subsequent hydrolysis. This process adds another step to the already complicated and expensive Windaus method, thus negating somewhat the advantage of the higher yields reported to be obtained.

Other chemical methods for the separation of stigmasterol from the sitosterols which met with failure were the attempt by Windaus (loc. cit.) to separate the mixture of steryl acetates produced by the acetylation of a mixture of phytosterols, and by Ladenbury et al., J. Org. Chem., 3, 294 (1938) to separate the azobenzoates of the soysterols by chromatography.

Of the methods involving chemical reactions for the separation of stigmasterol from the sitosterols thus reported, only the complicated method of Windaus has been used to any extent by those skilled in the art. That method was developed by Windaus after fruitless attempts to ascertain the composition of phytosterols by physical methods, e. g., by repeated shaking of phytosterols with various organic solvents. Despite shaking the phytosterols four different times with three different solvents, a uniform product could not be obtained. That procedure was then abandoned as hopeless. The melting point of Windaus' final product (140–144 degrees centigrade) is ample evidence of the discouraging results which were obtained. Table I below lists the melting points of mixtures of soysterols (obtained by the process of the present invention) containing various percentages of stigmasterol.

TABLE I

| Percent stigmasterol: | Melting point, °C. |
| --- | --- |
| 11.2 | 128–134 |
| 20.7 | 137.5–140.5 |
| 28.5 | 139–145 |
| 40.3 | 140.5–153 |
| 51.7 | 145–157 |
| 88.1 | 162–167 |
| 97.5 | 169–171.5 |

Hickman, Ind. Eng. Chem., 32, 1451 (1940), attempted a purification of stigmasterol in mixture with sitosterols by molecular distillation without success.

Although stigmasterol has been known for almost fifty years and has utility as an abundant precursor to physiologically active steroids, the circuitous chemical method of Windaus heretofore was the accepted method of obtaining stigmasterol from a mixture with sitosterols.

Windaus in his early work was attempting to determine the composition of the phytosterols. Not only were the leaching operations employed by him discouraging, since no pure product could be obtained, but it appeared that the components of the phytosterols were so similar in physical properties that only infinitesimal yields of a slightly purified component could be obtained by that technique. It has since been conclusively established that the components of the phytosterols are in fact closely related in physical properties when in mixture. For this reason, heretofore only processes which included reactions which produced a significant change in the structure of the phytosterols were believed practical for their separation.

We have now discovered, however, despite the discouraging results obtained by Windaus and Hickman, and the very similar physical properties of stigmasterol and the sitosterols in the mixture, that stigmasterol of increased purity can be obtained with a good recovery of the stigmasterol by employing a countercurrent extraction of the present invention as described herein. By employing the appropriate conditions, stigmasterol of almost any desired purity can be obtained and with high recovery of the stigmasterol.

Solvents employed in the process of the present invention are selective organic solvents having a greater solvent affinity for the sitosterols, determined on a portion of the starting sterol mixture to be used in the countercurrent extraction process, employing a volume of the organic solvent which dissolves approximately one half of the solids (e. g., forty to sixty percent) of the portion of the sterol mixture tested.

A measure of the degree of selectivity of a selective organic solvent is the relative distribution coefficient ($\beta$ value) of the organic solvent. This $\beta$ value is determined by partially dissolving a mixture of stigmasterol and sitosterols in an organic solvent, according to the preceding paragraph, and then determining the stigmasterol and sitosterols content of the dissolved and of the undissolved solids. The $\beta$ value of the solvent, for that particular mixture and solvent-solid ratio, can be determined by the following formula:

$$\beta = \frac{S_c \times NS_{ml}}{NS_c \times S_{ml}}$$

wherein $S_c$ is the stigmasterol content (percent) of the undissolved solids (cake), $NS_c$ is the non-stigmasterol (sitosterols) content (percent) of the undissolved solids (by difference), $NS_{ml}$ is the non-stigmasterol content (percent) of the dissolved solids in the mother liquor (by difference) and $S_{ml}$ is the stigmasterol content (percent) of the dissolved solids.

If the relative distribution coefficient of an organic solvent is greater than one for a mixture of stigmasterol and sitosterols at a particular volume of solvent, then that organic solvent produces undissolved solids of enriched stigmasterol content over the original mixture. The solvents employed in the process of the present invention are those selective organic solvents having a relative distribution coefficient greater than 1.5 at a volume of solvent which dissolves about one half of the total solids of a sample of the sterol mixture employed as starting mixture in the process. These solvents produce an extraction product of high stigmasterol content efficiently and economically. It is likewise desirable, for economic and operating reasons, that the selective organic solvent employed in the process of the present invention be readily available and reasonably inexpensive, be noncorrosive to equipment, be chemically inert to sterols, possess a high solvent power for sterols, present no difficulty manageable safety problems such as fire, explosion, and toxicity, and possess long-term stability in order to permit repeated recycling, reclaiming, and reusing.

The data required for determining $\beta$ value are conveniently obtained as follows, employing a stigmasterol-sitosterols mixture and a volume of the organic solvent which at room temperature dissolves approximately one-half of the sterols mixture, as already stated in the foregoing. The sterols-solvent slurry is brought to equilibrium, preferably by vigorous agitation for at least one-half hour at temperatures between about twenty and about 35 degrees centigrade. Alternatively, equilibration can be achieved by heating the slurry to a sufficiently high temperature to dissolve the sterols, slowly cooling the resulting solution, with stirring, to between about twenty and about 35 degrees centigrade, and maintaining the resulting slurry at substantially the same reduced temperature conditions for at least one-half hour. The solid phase (cake or undissolved solids) and the liquid phase (mother liquor containing dissolved solids) of the equilibrated slurry are separated by conventional means, such as filtration or centrifugation. The cake is dried and its stigmasterol content is determined by assay, e. g., infrared assay; the non-stigmasterol (sitosterols) content is determined by difference. The dissolved solids of the mother liquor are isolated by evaporating the mother liquor to dryness and the stigmasterol content of the dry residue is determined by assay, e. g., infrared assay; the non-stigmasterol (sitosterols) content is determined by difference. With these data at hand the $\beta$ value of the solvent, for the particular mixture and solvent-solid ratio, is conveniently calculated in accordance with the preceding formula.

Preferred organic solvents are those selective organic solvents which are carbon compounds having from one to eight carbon atoms, inclusive, and which have at least one additional element selected from the group consisting of hydrogen, oxygen, chlorine, and bromine; which are liquids at ordinary temperatures and pressures, and which have relative distribution coefficients ($\beta$ values) greater than 1.5. Representative solvents include lower aliphatic hydrocarbons, such as n-pentane, n-hexane, n-heptane, Skellysolve B (essentially a mixture of hexanes), Skellysolve C (essentially a mixture of hexanes and heptanes), petroleum ether, isooctane, cyclohexane, methylcyclohexane, 1-pentene, 1-octene, and the like; halogenated lower aliphatic hydrocarbons, such as ethylene dichloride, methylene chloride, propylene chloride, chloroform, ethylene dibromide, tetrachloroethylene, carbon tetrachloride, and the like; mixtures of lower aliphatic hydrocarbons and halogenated lower aliphatic hydrocarbons, such as a fifty percent n-heptane-fifty percent ethylene dichloride mixture by volume, or the n-heptane-ethylene dichloride azeotrope, consisting of approximately 37 percent n-heptane and 63 percent ethylene dichloride by volume, and the like; lower aromatic hydrocarbons, such as benzene, toluene, xylene, and the like; lower aliphatic ketones, such as acetone, methyl isobutyl ketone, and the like; lower aliphatic alcohols, such as ethanol, isobutyl alcohol, n-butyl alcohol, n-propyl alcohol, n-amyl alcohol, 2-methoxyethanol, 2-ethoxyethanol, o-methylcyclohexanol, and the like; halogenated lower aromatic hydrocarbons, such as chlorobenzene, bromobenzene, o-dichlorobenzene, and the like; lower aliphatic ethers, such as diisopropyl ether, dioxane, and the like; and lower aliphatic esters, such as ethyl acetate, amyl acetate, ethyl butyrate, and the like. Of these solvents, lower aliphatic hydrocarbons and halogenated lower aliphatic hydrocarbons are preferred, especially ethylene dichloride and n-heptane, and mixtures thereof, particularly their azeotropic mixture having, as already noted, a composition of approximately 37 percent n-heptane and 63 percent ethylene dichloride by volume.

By way of further illustration, Table II below shows the results of experiments in which relative distribution coefficients were determined, using representative organic solvents. In each instance, as can be seen from the table, the ratio of volume of solvent to weight of starting solid stigmasterol and sitosterols mixture was such that approximately one-half of the solid material was in solution after equilibration of the slurry. Except as otherwise noted, the starting sterol mixtures were mixed soysterols of varying stigmasterol content.

TABLE II

LOWER ALIPHATIC HYDROCARBONS

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 25.0 | 17.0 | n-hexane | 125.0 | 12.5 | 21.5 | 10.8 | 11.2 | 43.0 | 2.2 |
| 25.0 | 17.0 | do | 175.0 | 11.0 | 24.5 | 13.0 | 11.6 | 52.0 | 2.5 |
| 20.0 | 20.2 | Skellysolve B | 310.0 | 10.8 | 23.3 | 8.9 | 13.6 | 44.5 | 1.9 |
| 10.0 | 17.8 | Skellysolve C | 250.0 | 4.4 | 23.0 | 5.6 | 12.8 | 56.0 | 2.0 |
| 10.0 | 17.8 | n-heptane | 380.0 | 4.2 | 25.8 | 5.7 | 9.4 | 57.0 | 3.4 |

LOWER HALOGENATED ALIPHATIC HYDROCARBONS

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 1.0 | 18.0 | ethylene dichloride | 7.0 | 0.48 | 25.8 | 0.52 | 10.8 | 52.0 | 2.9 |
| 268.0 | 22.3 | do | 864.0 | 125.0 | 28.6 | 143.0 | 19.4 | 53.5 | 1.66 |
| 36.9 | 18.5 | methylene chloride | 156.0 | 20.7 | 24.0 | 16.2 | 11.5 | 44.0 | 2.4 |
| 10.0 | 17.8 | propylene dichloride | 40.0 | 5.58 | 21.1 | 4.19 | 9.4 | 42.0 | 2.5 |
| 10.0 | 17.8 | chloroform | 20.0 | 5.6 | 20.1 | 4.6 | 11.2 | 46.0 | 2.0 |
| 10.0 | 17.8 | ethylene dibromide | 60.0 | 5.2 | 20.2 | 4.5 | 12.7 | 45.0 | 1.7 |

LOWER ALIPHATIC HYDROCARBON-HALOGENATED LOWER ALIPHATIC HYDROCARBON MIXTURES

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 10.0 | 17.8 | 50% n-heptane, 50% ethylene dichloride, by volume. | 62.0 | 4.12 | 23.3 | 5.73 | 12.0 | 57.3 | 2.2 |
| 25.0 | 27.0 | 37% n-heptane, 63% ethylene dichloride, by volume (azeotrope). | 62.5 | 14.0 | 33.3 | 10.9 | 14.8 | 43.6 | 2.9 |
| 25.0 | 27.0 | do | 83.4 | 11.1 | 38.6 | 13.4 | 15.9 | 53.5 | 3.3 |
| 25.0 | 17.0 | do | 65.0 | 11.4 | 23.0 | 12.2 | 12.4 | 48.8 | 2.1 |
| 11.7×10⁶ (25,720 lb.) | 19.0 | do | 25.5×10⁶ (6,720 gal.) | 5.08×10⁶ (11,200 lb.) | 27.8 | 6.29×10⁶ (14,180 lb.) | 12.3 | 56.0 | 2.76 |
| 10.0 ᵃ | 29.0 | do | 23.0 | 4.8 | 46.6 | 4.3 | 11.0 | 43.0 | 7.1 |
| 10.0 ᵃ | 29.0 | do | 37.0 | 3.4 | 57.1 | 4.4 | 15.1 | 44.0 | 7.6 |

LOWER AROMATIC HYDROCARBONS

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 25.0 | 17.0 | benzene | 60.0 | 13.3 | 24.5 | 10.1 | 7.6 | 40.0 | 4.0 |
| 25.0 | 17.0 | do | 90.0 | 10.9 | 25.3 | 13.4 | 10.9 | 54.0 | 2.8 |
| 25.0 | 17.0 | toluene | 60.0 | 10.4 | 25.6 | 13.4 | 10.7 | 54.0 | 2.9 |
| 25.0 | 17.0 | do | 75.0 | 10.0 | 25.4 | 13.8 | 10.9 | 55.0 | 2.8 |

HALOGENATED LOWER AROMATIC HYDROCARBONS

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 10.0 | 17.8 | chlorobenzene | 25.0 | 4.6 | 24.2 | 5.4 | 12.4 | 54.0 | 2.3 |

LOWER ALIPHATIC KETONES

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 20.0 | 27.3 | acetone | 370.0 | 11.0 | 31.5 | 8.84 | 18.6 | 44.1 | 2.0 |
| 1.0 | 18.0 | methyl isobutyl ketone | 8.0 | 0.43 | 26.5 | 0.57 | 11.6 | 57.0 | 2.7 |
| 25.0 | 17.0 | do | 200.0 | 11.7 | 23.7 | 12.8 | 8.8 | 51.0 | 3.2 |

LOWER ALIPHATIC ALCOHOLS

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 10.0 | 27.3 | ethanol | 740.0 | 4.6 | 34.4 | 5.6 | 19.2 | 56.0 | 2.2 |
| 10.0 | 17.8 | n-butyl alcohol | 21.0 | 4.6 | 25.0 | 5.4 | 11.7 | 54.0 | 2.5 |

LOWER ALIPHATIC ETHERS

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 1.0 | 18.0 | diisopropyl ether | 8.0 | 0.46 | 24.7 | 0.54 | 12.3 | 54.0 | 2.4 |

LOWER ALIPHATIC ESTERS

| Weight of sterols (grams) | Stigmasterol assay of sterols (percent) | Solvent | Volume of solvent (cubic centimeters) | Weight of filter cake (grams) | Stigmasterol assay of filter cake (percent) | Weight of solids in filtrate (grams) | Stigmasterol assay of solids in filtrate (percent) | Percent of sterols dissolved | Relative distribution coefficient ($\beta$) |
|---|---|---|---|---|---|---|---|---|---|
| 1.0 | 18.0 | ethyl acetate | 6.5 | 0.45 | 24.6 | 0.55 | 12.6 | 55.0 | 2.2 |

ᵃ Sugar cane sterols instead of soysterols.

As can be seen from Table II, with solvents having β values greater than 1.5, substantial enrichment occurs in the undissolved solids. Repeating the extraction operation on the undissolved solids from the previous extraction with fresh solvent under the proper conditions will produce further enrichment. Performing enough extractions and employing a solvent with a relatively high β value, will produce stigmasterol of high purity.

Table III below shows an experiment in which a mixture of 200 grams of soysterols assaying 28.8 percent stigmasterol was extracted with eight successive portions of ethylene dichloride. Each extraction was conducted at forty degrees centigrade for one hour.

TABLE III

| | Volume of solvent (cc.) | Weight of residue (g.) | Stigmasterol assay (percent) | Recovery of stigmasterol (percent) |
|---|---|---|---|---|
| 1 | 400 | 157 | | |
| 2 | 400 | 112 | | |
| 3 | 400 | 49 | | |
| 4 | 400 | 17.3 | 77.8 | 23.4 |
| 5 | 80 | 12.6 | 84.6 | 18.5 |
| 6 | 68.5 | 10.2 | 82 | 14.5 |
| 7 | 54.5 | 6.9 | 95 | 11.4 |
| 8 | 43.3 | 5.1 | 97.6 | 8.7 |

The drop in stigmasterol assay of the undissolved solids from the sixth extraction was due to the concentration, during the extractions, of an insoluble impurity. This impurity was removed prior to the seventh extraction by dissolving all of the sterols in chloroform, removing the impurity by filtration, and distilling the chloroform from the filtrate.

It can be seen from Table III that stigmasterol of high purity can be obtained from a mixture with sitosterols by repeated extraction operations. Although previous work indicated that stigmasterol and the sitosterols were inseparable by physical means, they are in fact separable, under the proper conditions, by repeated extractions with an organic solvent. Stigmasterol of high purity is now shown for the first time to be isolatable by physical means, although in poor yields.

As shown in Table III, a very low recovery of stigmasterol is obtainable by the simple repeated extractions necessary to produce stigmasterol of high purity. Although the production of stigmasterol of high purity by simple repeated extractions may be of considerable interest, the cost of the thus-produced stigmasterol would be prohibitive due to the great loss of stigmasterol in the extractions.

The present invention is primarily concerned with a process for the production of stigmasterol of high purity and in good yields. By employing a countercurrent extraction process in the separation of stigmasterol and sitosterols, using an organic solvent as herein described, a high proportion of the stigmasterol can be recovered in high purity and low cost stigmasterol is thus produced. The countercurrent process of the present invention is designed to produce an extraction product which assays at least sixty percent stigmasterol, preferably at least eighty percent stigmasterol, conveniently and in high yields.

In carrying out the process of the present invention, stigmasterol can be isolated from a starting solid mixture consisting essentially of stigmasterol and sitosterols by subjecting the starting mixture to countercurrent selective extraction with a selective organic solvent and separating the thus-purified stigmasterol from the organic solvent.

There are three general types of countercurrent extractions, i. e., continuous, semi-continuous and batchwise (multistage). U. S. Patents 2,545,938, 2,273,557 and 2,614,911 illustrate apparatus and methods of continuous countercurrent extractions. U. S. Patents 2,117,113 and 2,512,710 illustrate semi-continuous countercurrent extraction apparatus and methods in which the flow of solvent is continuous but the solids are handled batchwise. If a process is utilized in which the flow of solvent is interrupted and a continuous flow of solids is employed, as in U. S. Patent 2,547,577 another type of semi-continuous countercurrent extraction is employed. U. S. Patent 2,188,919 illustrates a process involving a batchwise countercurrent extraction. The adaptation of the various apparatus available in the prior art to the instant process will be apparent to those skilled in the art. See, for example, Perry, "Chemical Engineers' Handbook," McGraw-Hill Publishers, 953 (1950), which illustrates a Dorr washing tray thickener. The batchwise operation, especially the multi-batchwise operation, is the preferred method of countercurrent extraction and will therefore be discussed in more detail. It is to be understood however that continuous and semi-continuous techniques can also be employed.

In a countercurrent extraction, optimum or "steady state" yields are not realized immediately. Since fresh solvent is ordinarily employed in starting up the extraction process, more of the stigmasterol will be dissolved than at a later time in the process when the solvent contains some dissolved stigmasterol. For this reason, the ultimate yield of the process will be delayed until the system is at steady state. This phenomenon is well known in countercurrent extractions and a discussion on the subject can be found in Treybal, "Liquid Extraction," McGraw-Hill, Chapter 7 (1951). Other pertinent discussions on the subject of countercurrent extractions can be found in Perry (loc. cit., especially pages 716 to 718); Scheibel, Ind. Eng. Chem., 43, 242 (1951); ibid., 44, 2942 (1952); and Compere and Ryland, ibid., 43, 239 (1951).

In a batchwise countercurrent extraction employing, for example, the azeotropic mixture of ethylene dichloride and n-heptane as the solvent, eight enriching stages and two stripping stages, employing the technique shown in the drawing, and using a volume of solvent in each stage which leaves an amount of stigmasterol in the undissolved portion of the solids about 1.7 times the amount in the dissolved portion, the steady state recovery of stigmasterol, based on the starting stigmasterol, can be calculated to be in excess of eighty percent. Employing different solvents, volume of solvents, and number of stages will produce varied purity and yields of stigmasterol.

Generally, in a batchwise countercurrent extraction, a portion of solid is mixed with an appropriate volume of solvent in a tank or cell and the extraction completed in this cell, i. e., one portion of the solids to be or being extracted is separate from another portion to be or being extracted, and one volume of the extracting solvent is separate from another volume. In other words, one stage is completely discontinuous from another. This stage constitutes an enriching stage. The solvent is then removed by filtration, centrifugation, or settling, etc. and used, along with additional solvent if necessary, to extract a second charge of solids. The solids from the first extraction are extracted with fresh solvent and this operation is repeated until stigmasterol of desired purity is obtained. The filtrates from one cycle are used as at least a portion of the solvent in the extractions of a subsequent cycle. Thus a pattern is established wherein the solvent is moving in a direction countercurrent to the flow of solids. The drawing graphically illustrates such a process.

In the process shown in the drawing, stripping stages are also employed to improve the recovery of stigmasterol. The value of these stripping stages will be discussed hereinafter. Referring now only to the enriching stages, it can be seen from the drawing that the solvent (filtrate) travels in a direction opposite or countercurrent to the flow of solids (cake) and is a true batchwise countercurrent extraction. A process of this type is described in the examples hereinafter.

A batchwise countercurrent extraction has the advantage of permitting carefully controlled conditions of time of contact, ratio of solvent to solids, efficient mechanical separation of the extracted solids from the filtrate, etc. to be employed. After selecting the optimum solvent, volume of solvent, temperature, time, number of stages, etc., to produce the desired purity of stigmasterol in the first cycle of operation, these conditions can be maintained in successive cycles during the countercurrent operation giving reasonable assurance of a product of controlled purity, or the conditions can be varied as may be desired.

The batchwise countercurrent extraction process of the present invention usually involves at least four enriching stages per cycle and ordinarily, at least five. Six enriching stages, when employing a reasonably efficient solvent, are ordinarily sufficient to achieve the production of very high purity stigmasterol.

In a batchwise countercurrent extraction, desirable results are obtained when at least four enriching stages per cycle are employed and when the extraction is performed in a manner such that, in the slurry produced in these stages, more than fifty percent of the stigmasterol remains undissolved ($E_s$, described infra, $=>1$). An E value of 1.2–3 is a satisfactory normal operating range and advantageous results are obtained if $E_s$ is between 1.2 and 6, e. g., if between about 55 and 85 percent of the stigmasterol is undissolved in these stages, all of which can be accomplished by temperature and solvent volume adjustment as indicated previously and as will be readily apparent to one skilled in the art. In addition, especially advantageous quality product is obtained if the proportion of undissolved to dissolved stigmasterol in these stages is maintained at least 1.5 times the proportion of undissolved to dissolved sitosterols, which attends the use in these stages of a solvent having a relatively high $\beta$ value above 1.5.

In the instant countercurrent extraction process of producing stigmasterol, a factor which influences yield is the number of stripping stages employed. A stripping stage involves removing (stripping) a portion of the stigmasterol from the mother liquors (filtrates) obtained at the end of the process opposite from the flow of undissolved solid. The solids contained in these filtrates ordinarily have a stigmasterol content less than the starting feed stock or mixture and for this reason cannot most advantageously be reentered into the enriching portion of the countercurrent process to increase the yield. To obtain a mixture from these filtrates more suitable for reentry into the system, a portion of the dissolved sterols is precipitated therefrom, e. g., by distillation of some of the solvent, chilling the filtrate or adding another solvent. It is desirable that the thus-precipitated sterols differ in stigmasterol content, either greater or less, from that of the solids dissolved in the mother liquor entering the stripping stage. If the content is greater, the undissolved solids can be separated from solvent and reentered into the system at the appropriate point, preferably at a point where the stigmasterol content of the undissolved solids corresponds most closely to the solids in the system. If the content is less, that is, if the solvent (mother liquor) fraction obtained from the stripping stage contains the solids having the higher stigmasterol content, these solids can be separated from the solvent and added to the system as described above or, if desired, both the solvent and dissolved solids can be added to the system.

A preferred stripping technique involves stripping, from the mother liquor obtained from the first extraction of the feed stock, a portion of the dissolved sterols which comprises from about 35 to eighty and preferably from about fifty to about seventy percent of the dissolved stigmasterol and combining the stripped solids with the feed stock of a subsequent cycle for extraction in the subsequent cycle.

If, even after the addition of a stripping stage to the countercurrent extraction, the yield of stigmasterol is still less than desired, further stripping stages can be added, as shown in the drawing. The addition of additional stripping stages to the system may possibly but not necessarily lower the quality of the thus-obtained stigmasterol. This can be overcome by other variations in the system, for example by the addition of another enriching stage.

The preferred technique for the second stripping stage involves stripping, from the residual portion of the sterols remaining from the first stripping stage, another portion of sterols comprising from about 35 to eighty, preferably fifty to about seventy, percent of the residual dissolved stigmasterol and combining the stripped solids with the mother liquor obtained from the first enriching stage to be employed in the first stripping stage.

In a countercurrent process having a selected number of extraction stages and stripping stages, other factors also influence the quality as well as the yield of the stigmasterol thus obtained. These factors include the depth of leaching at each extraction stage, selectivity of the solvent, temperature, time, mechanical efficiency of separation of solvent and undissolved solid from stage to stage, the quality of the starting mixture, etc.

The stigmasterol content of the starting mixture will, of course, also affect the results obtained in any selected extraction procedure. The sources of stigmasterol produce mixtures varying considerably in stigmasterol content. Ordinarily, the stigmasterol content of sterol fractions from natural sources will vary between about five and about 35 percent. Sterols, which average about fifteen to 35 percent stigmasterol, e. g., soysterols and sugar cane sterols which are abundant sources of stigmasterol, are preferred starting sterol mixtures.

It is apparent that, under otherwise identical conditions, an extraction process employing a starting sterol mixture assaying five percent stigmasterol will produce an extraction product having a different stigmasterol content and a different yield of product than the same process employing starting sterols assaying 35 percent stigmasterol. As stated previously, the starting sterol mixtures containing from about fifteen to 35 percent stigmasterol are preferred. The disadvantage of employing starting sterol mixtures of low stigmasterol content can be overcome to a certain extent by, for example, increasing the number of enriching stages and stripping stages in the extraction process.

The depth of leaching, i. e., the fraction of the stigmasterol dissolved in an extraction stage, importantly affects the efficiency of the process. Table IV below shows the results of extractions of 25 gram samples of soysterols assaying 27.3 percent stigmasterol with various volumes of the azeotropic mixture of ethylene dichloride and n-heptane. The $\beta$ values and depth of leaching ($E_s$) at the various volumes of solvent used are shown.

TABLE IV

| Sample | 1 | 2 | 3 | 4 | 5 | 6 | 7 | 8 | 9 |
|---|---|---|---|---|---|---|---|---|---|
| Milliliters of solvent | 27.8 | 50.5 | 62.5 | 83.4 | 100 | 125 | 167 | 200 | 225 |
| Grams of solids (cake) | 22.0 | 17.5 | 14.0 | 11.1 | 9.1 | 6.3 | 4.3 | 2.2 | 1.3 |
| Stigmasterol assay (cake) (percent) | 27.8 | 29.3 | 33.3 | 38.6 | 43.9 | 57.3 | 59.3 | 65.0 | 70.8 |
| Stigmasterol yield (percent) | 89.0 | 77.5 | 67.5 | 62.5 | 58.2 | 52.6 | 37.2 | 20.8 | 13.4 |
| Grams of solids (filtrate) | 2.5 | 6.2 | 10.9 | 13.4 | 15.6 | 18.6 | 20.6 | 22.5 | 23.8 |
| Stigmasterol assay of solids (filtrate) (percent) | 12.1 | 13.0 | 14.8 | 15.9 | 16.5 | 15.9 | 19.3 | 21.3 | 23.1 |
| $E_s$ | 20.2 | 6.35 | 2.89 | 1.99 | 1.53 | 1.22 | 0.66 | 0.3 | 0.17 |
| $\beta$ | 2.92 | 2.76 | 2.88 | 3.32 | 3.97 | 7.1 | 6.48 | 6.88 | 8.32 |
| $E_s/\beta$ | 6.91 | 2.30 | 1.00 | 0.60 | 0.39 | 0.17 | 0.10 | 0.04 | 0.02 |
| Percent NS going to cake | 87.4 | 69.7 | 50.0 | 37.5 | 27.9 | 14.5 | 9.3 | 4.2 | 2.0 | wherein $E_s$ is the weight of stigmasterol in the undissolved solids (cake) divided by the weight of stigmasterol in the dissolved solids (filtrate) and NS is non-stigmasterol and $\beta$ is the relative distribution coefficient of the solvent.

Under preferred operating conditions employing a batchwise countercurrent process, the depth of leaching in each stage is preferably maintained so that greater than fifty percent of the stigmasterol is undissolved in an enriching stage, e. g., between 55 and 85 percent. Under these conditions, satisfactory yields of the stigmasterol can ordinarily be achieved. In addition, for satisfactory quality stigmasterol, the $E_s$ value should be maintained such that $E_s/\beta$ is less than one (which means that at least fifty percent of the sitosterols are in a dissolved state), and for highest purity stigmasterol $E_s/\beta$ should be as low as possible.

Factors which may influence the selectivity of a solvent, and, accordingly, the most desirable volume of solvent at any stage, are temperature, moisture, time of extraction, the stigmasterol or other sterol content of the solids present in the stage, etc. Equilibration temperatures between fifteen and 45 degrees centigrade, or even somewhat higher or lower, are preferred. Temperatures somewhat above room temperature are advantageous with some of the solvents. For the most part, an extraction time of one hour appears to be sufficient to reach practical equilibrium in an extraction, if the particle size of the material to be extracted is quite small. Extraction times as short as five minutes have sometimes given results comparable to those obtained in other cases employing extraction times of one hour or longer. Whereas a solvent may be highly selective in a stage employing total solids assaying, for example, ten percent stigmasterol, the selectivity of the same solvent may be found to be less at a stage employing total solids assaying, for example, seventy percent stigmasterol or vice versa.

Crude mixtures of sterols from natural sources frequently contain various amounts of a non-sterolic material which is less soluble than stigmasterol. It has often been found advantageous to cleanup these starting mixtures with, for example, a small amount of chloroform, the n-heptane-ethylene dichloride azeotrope, or other solvent which will dissolve the sterols but not the objectionable impurities. This can be achieved by dissolving all of the sterolic material in, illustratively, chloroform and separating the undissolved solid by filtration. The amount of solid which is undissolved by the solvent is usually on the order of about one to five percent of the total starting solids. Although this amount is small, the presence of this impurity in the countercurrent leaching process is objectionable since it would be concentrated with the stigmasterol. The dissolved sterols are then used as the starting mixture in the countercurrent extraction process, after at least partial separation from the cleanup solvent in the event the cleanup and extraction solvents are different.

Starting sterol mixtures, especially soysterols, also contain sitosterols, and frequently other materials, which are considerably more soluble than stigmasterol in many solvents. This more soluble material can advantageously be removed in part with little loss of stigmasterol prior to the use of the sterols as starting mixture in a countercurrent extraction.

Soysterols can be divided roughly into four fractions, e. g., ten to forty percent of material much more soluble than stigmasterol; 25 to 65 percent of material somewhat more soluble than stigmasterol; fifteen to 25 percent of material more insoluble than stigmasterol; and one to ten percent of material more insoluble than stigmasterol. The material much more soluble than stigmasterol can be separated from the other fractions with relative ease and with little loss of stigmasterol. A preferred procedure involves the partial removal of the less soluble material, as described above, as well as the partial removal of the material which is much more soluble than the stigmasterol before the countercurrent extraction process of this invention is begun, for example, by cleanup of the starting sterols as described herein.

A simple procedure for the removal of the fraction much more soluble than stigmasterol which is found, for example, in soysterols, involves partially extracting the starting sterol mixture with sufficient solvent to remove as much of this much more soluble fraction as possible without dissolving a significant amount of the stigmasterol. From one to two leachings with the same or different solvents is usually sufficient. For example, crude soysterols ordinarily are yellow to dark brown in color and contain significant amounts of very soluble non-sterolic impurities. A leaching of this crude material with Skellysolve B hexane hydrocarbons, petroleum ether, or other solvent in which most of the sterols are relatively insoluble will remove most of the color and the very soluble portion of the sterols. The use of about three to seven milliliters of Skellysolve B hexane hydrocarbons per gram of sterols, for example, removes most of the very soluble material present in most soysterols with a loss of only about three to six percent of the available stigmasterol. A few test cleanup operations, employing various amounts of the chosen solvent, on a portion of each batch for starting mixture will readily indicate the optimum volume of solvent to employ in this cleanup operation.

A starting sterol mixture, when significantly crude, may therefore be purified prior to the countercurrent process of this invention, to remove any non-sterolic material and the portion of sterolic which is much more soluble than the stigmasterol. Although this latter material can be removed in the countercurrent process of this invention, it may be more economically removed in advance. One aspect of this invention involves such a cleanup and enrichment of the sterol mixture prior to introduction as a starting mixture in the countercurrent process of the invention.

The stigmasterol content of a mixture of stigmasterol and sitosterols can be determined by the Windaus method (See Neu and Ehrbacher, loc. cit.) employing the differences in unsaturation between the sitosterols and stigmasterol. This method is not accurate, however. A more accurate method involves an infrared spectrum analysis of the mixture. Stigmasterol has a strong infrared absorption at 970 cm.$^{-1}$ which is apparently due to the presence of the 20(22)-double bond. The stigmasterol content of a sample can be determined in the following manner: The sample is dissolved, at a precise concentration of 50.0 milligrams per milliliter, in chloroform and the spectrum of this solution is recorded from 930 cm.$^{-1}$ to 1025 cm.$^{-1}$ in a double beam spectrophotometer which gives at least 95 percent transmission at 970 cm.$^{-1}$ when both the sample and reference cells are filled with chloroform alone. The cells are approximately 0.5 millimeter thick. A sample of pure stigmasterol is spectroanalyzed in exactly the same manner. On the records of the absorption pattern of both the unknown sample and the stigmasterol, a base-line, having a slope of 0.2, is drawn from the peak absorption found at 990 cm.$^{-1}$. The stigmasterol content of the sample is then calculated as follows:

$$C = 100 \frac{\log (I_B/I_P) \text{ (unknown)}}{\log (I_B/I_P) \text{ (stigmasterol)}}$$

wherein $I_B$ is the base-line transmission (percent) at 970 cm.$^{-1}$ and $I_P$ is the actual transmission (percent) at 970 cm.$^{-1}$. C is the percent stigmasterol content of the unknown sample. The accuracy is ± three percent.

According to the process of the present invention, the stigmasterol-rich product will be obtained as the final undissolved solids. Separating these solids by filtration, centrifugation or settling, etc., from the organic solvent yields an isolated product of a high stigmasterol content controlled by the operating conditions of the countercurrent process.

Similarly, if sitosterols of enhanced purity are the desired product, they can be isolated in the same manner described above and, under the conditions described above, will be found at the end of the extraction process opposite the end at which the product of enriched stigmasterol assay is found.

The following examples are illustrative of the process of the present invention but are not to be construed as limiting.

EXAMPLE 1

*Four stage batchwise countercurrent extraction*

The feed stock for this experiment consisted of soysterols which had been cleaned up with chloroform and Skellysolve B and which then assayed 27 percent stigmasterol and was in the form of a fine powder. The original soysterols assayed 22.5 percent. In the cleanup operation, the original sterols were stirred for several hours at room temperature with five liters of Skellysolve B per kilogram of sterols, filtered, and reslurried with about 750 milliliters of Skellysolve B per kilogram of filtered solid. The undissolved solids were filtered, dried and assayed. These solids represented an 87 percent recovery of the total solids and an almost quantitative recovery of the stigmasterol.

These Skellysolve B cleaned up soysterols were then dissolved in a minimum of chloroform in a second cleanup operation, leaving a small insoluble residue which was removed by filtration. The chloroform was distilled from the filtrate with a 96.5 percent recovery of the total solids and an almost quantitative recovery of the stigmasterol.

The countercurrent extraction of these twice cleaned up sterols assaying 27 percent stigmasterol involved a four stage four cycle batchwise countercurrent extraction. The extraction solvent was a 50:50 mixture, by volume, of ethylene dichloride and n-heptane. The extraction temperature varied between 26 and 32 degrees centigrade. The extraction time in each instance was at least one half hour. A 41 gram sample of the cleaned up sterols described above was employed as the feed stock in each of the cycles.

In the first cycle, a 41 gram portion was extracted four successive times with 180, 195.3, 39.1 and 16.5 milliliters, respectively, of solvent. The slurry obtained from each extraction (stage) was filtered and the cake thus obtained, after drying, was dispersed as a slurry in the next extraction. In the fourth stage of the first cycle, a cake of 2.64 grams of sterol assaying 79.2 percent stigmasterol, representing an 18.8 percent recovery of the starting stigmasterol was finally obtained.

In the next cycle, a second 41 gram portion of sterols was extracted four successive times. The first extraction (stage) employed 139 milliliters of fresh solvent mixed with the 78 milliliters of mother liquor obtained from the second stage of the preceding cycle. The next stage employed 104.7 milliliters of fresh solvent mixed with the 24 milliliters of mother liquor obtained from the third stage of the preceding cycle. The third stage employed 37.5 milliliters of fresh solvent mixed with the 19 milliliters of mother liquor obtained from the fourth stage of the preceding cycle. The fourth stage employed 22 milliliters of fresh solvent. In the second cycle, 4.18 grams of sterols assaying 76.8 percent stigmasterol, representing a 28.6 percent recovery of the starting stigmasterol was finally obtained.

Following this pattern of extraction, employing, in the first three stages of each successive cycle, the mother liquors from the last three stages of the previous cycle mixed with fresh solvent, there was obtained in the next cycle, 5.08 grams of sterols assaying 76.5 percent stigmasterol and in the fourth cycle, 7.17 grams of sterols assaying 76.8 percent stigmasterol representing a 34.7 percent and 49.1 percent recovery, respectively, of the starting stigmasterol present in each of the 41 gram samples of starting sterols.

EXAMPLE 2

*Five stage batchwise countercurrent extraction*

Under the same conditions described in Example 1 and employing the same solvent, but regulating the amount of fresh solvent employed in each stage so as to obtain a ratio of undissolved stigmasterol to dissolved stigmasterol ($E_s$) at each stage of about 2.0, a five stage batchwise countercurrent extraction was performed. The following eight cycles are taken from this countercurrent extraction. The eighth cycle represents conditions which are within about eighty percent of steady state.

In the first cycle, there was employed, in the first four stages, the solids separated from the last four mother liquors from a previous countercurrent extraction, in the order obtained. The solids from the first mother liquor employed in the first cycle weighed 28.21 grams and assayed 22.6 percent stigmasterol; the solids from the second mother liquor weighed 8.35 grams and assayed 28.1 percent stigmasterol; the solids from the third mother liquor weighed 4.11 grams and assayed 35.1 percent stigmasterol and the solids from the fourth mother liquor weighed 3.48 grams and assayed 53.8 percent stigmasterol.

In the first cycle, the 41 gram sample of feed sterols was extracted five successive times employing fresh solvent as described below. In the first stage (extraction), a mixture of 238 milliliters of fresh solvent and the solids from the first mother liquor described above was employed; in the second stage, a mixture of 174 milliliters of fresh solvent and the solids from the second mother liquor described above; in the third stage, a mixture of 88.5 milliliters of fresh solvent and the solids from the third mother liquor described above; in the fourth stage, 70.7 milliliters of fresh solvent and solids from the fourth mother liquor described above; and in the fifth stage, 38.5 milliliters of fresh solvent. There was thus obtained 3.49 grams of sterols assaying 79.1 percent stigmasterol, representing a 24.6 percent recovery of the 11.1 grams of stigmasterol present in the feed sterols employed in that cycle.

In the second cycle, the same method of extraction was employed using the solids from mother liquors from the last four stages of the preceding cycle, in the order obtained, mixed with, respectively, 217, 142, 116.7 and 81 milliliters of fresh solvent. In the fifth stage, 44.5 milliliters of fresh solvent was employed. There was thus obtained 4.02 grams of sterols assaying 85.3 percent stigmasterol, representing a 30.6 percent recovery of the stigmasterol.

In the third cycle, using the same method and using the solids from the mother liquors from the last four stages, in the order obtained, from the preceding cycle mixed with, respectively, 196, 164, 102 and 89.5 milliliters of fresh solvent, and in the fifth stage 51.8 milliliters of fresh solvent, there was obtained 4.56 grams of sterols assaying 84.3 percent stigmasterol, representing a 34.4 percent recovery of the stigmasterol.

In the fourth cycle, using the same method and using the solids from the mother liquors from the last four stages, in the same order obtained, from the preceding cycle mixed, respectively, with 202, 177.5, 134 and 101.5 milliliters of fresh solvent, and in the fifth stage, 62.7 milliliters of fresh solvent, there was obtained 4.85 grams of sterols assaying 87.7 percent stigmasterol, representing a 38 percent recovery of the stigmasterol.

In the fifth cycle, using the same method and using the solids from the mother liquors from the last four stages, in the same order obtained, from the preceding cycle mixed, respectively, with 197, 177, 152 and 117 milliliters of fresh solvent, and in the fifth stage, 71.7 milliliters of fresh solvent, there was obtained 5.64 grams of sterols assaying 78 percent stigmasterol, representing a 39.3 percent recovery of the stigmasterol.

In the sixth cycle, using the same method and using the solids from the mother liquors from the last four stages, in the same order obtained, from the preceding cycle mixed, respectively, with 190, 175, 156.5 and 124 milliliters of fresh solvent, and in the fifth satge, 70.8 milliliters of fresh solvent, there was obtained 5.71 grams of sterols assaying 82.7 percent stigmasterol, representing a 42.1 percent recovery of the stigmasterol.

In the seventh cycle, using the same method and using the solids from the mother liquors from the last four stages, in the same order obtained, from the preceding cycle mixed, respectively, with 195, 179, 166 and 129 milliliters of fresh solvent, and in the fifth stage, 82 milliliters of fresh solvent, there was obtained 5.68 grams of sterols assaying 78.9 percent stigmasterol, representing a 40.0 percent recovery of the stigmasterol.

In the eighth cycle, using the same method and using the solids from the mother liquors from the last four stages, in the same order obtained, from the preceding cycle mixed, respectively, with 189, 177, 167 and 129.5 milliliters of fresh solvent, and in the fifth stage, 72.7 milliliters of fresh solvent, there was obtained 5.54 grams of sterols assaying 82.9 percent stigmasterol, representing a 41 percent recovery of the stigmasterol in the portion of soysterols employed as starting feed solids for that cycle.

EXAMPLE 3

*Batchwise countercurrent extraction with five enriching stages and one stripping stage*

The following four cycles are taken from a batchwise countercurrent extraction employing five enriching stages and one stripping stage. In this extraction 41 gram portions of sterols cleaned up as described hereinbefore, assaying 27 percent stigmasterol, were used as feed and mixed with the stripped sterols obtained from the stripping section of a preceding cycle. For convenience, the stripped sterols from one cycle were not reintroduced into the system at the first enriching stage of the next cycle but were reintroduced three cycles later at the first enriching stage. The solvent employed was a 50:50 mixture (by volume) of ethylene dichloride and n-heptane. In the enriching stages, the ratio of undissolved stigmasterol to dissolved stigmasterol ($E_s$) was maintained at about 2.0.

In a stripping stage, the mother liquor obtained from the first enriching stage of a cycle was stripped of a portion of the solids dissolved therein. This was accomplished by distilling the solvent and dissolving the residual solid sterols in seven milliliters per gram of residue of a hot 50:50 by volume mixture of ethylene dichloride and n-heptane. A portion of the dissolved sterols was then precipitated from the solution by the addition of an equal volume of warm methanol followed by one milliliter per gram of residue of water. The solution was cooled and stirred overnight at room temperature. The precipitated sterols were filtered and dried.

In this experiment, since the sterols obtained from the stripping stage were mixed with the feed sterols, the stripping stage of each cycle was regulated to yield precipitated sterols which approximated, as closely as possible, the feed sterols in stigmasterol assay.

In the first cycle, a 41 gram portion of feed sterols was mixed with 14.57 grams of sterols assaying 25.1 percent stigmasterol obtained from the first stripping stage of the third preceding cycle and the mixture extracted five successive times, first, with the solids separated from the mother liquors obtained from the last four stages of the preceding cycle, in the order obtained mixed with the preceding cycle, respectively, 251, 214, 183 and 137 milliliters of fresh solvent, and finally, with 81 milliliters of fresh solvent. The solids from the first of these mother liquors weighed 30.22 grams and assayed 17.45 percent stigmasterol; the second, 16.54 grams and assayed 27.3 percent; the third, 9.73 grams and assayed 37.1 percent; and the fourth, 3.87 grams and assayed 59.4 percent. There was thus obtained 6.13 grams of sterols assaying 85.3 percent stigmasterol, representing a 46.7 percent recovery of the 11.1 grams of stigmasterol present in the 41 grams of feed sterols employed in that cycle.

In the second cycle, a 41 gram portion of feed sterols was mixed with 14.65 grams of sterol assaying 25.4 percent stigmasterol obtained from the stripping stage of a previous cycle and the mixture extracted five successive times, first, with the solids from the mother liquors obtained from the last four stages of the preceding cycle described above, in the order obtained, mixed with, respectively, 263, 223, 193.5 and 153.5 milliliters of fresh solvent, and finally, with 86.9 milliliters of fresh solvent. There was thus obtained 6.62 grams of sterols assaying 84.4 percent stigmasterol, representing a 49.8 percent recovery of the stigmasterol.

In the third cycle, a 41 gram portion of feed sterols was mixed with 13.8 grams of sterols assaying 25.7 percent stigmasterol obtained from the stripping stage of a previous cycle and the mixture extracted five successive times, first with the solids from the mother liquors obtained from the last four stages of the second cycle described above, in the order obtained, mixed with, respectively, 252, 223, 192 and 191 milliliters of fresh solvent, and finally, with 100 milliliters of fresh solvent. There was thus obtained 7.00 grams of sterols assaying 86.9 percent stigmasterol, representing a 54.3 percent recovery of the stigmasterol.

In the fourth cycle, a 41 gram portion of feed sterols was mixed with the 17.6 grams of sterols assaying 25.4 percent stigmasterol obtained from the stripping stage of the first cycle described above and the mixture extracted five successive times, first, with the solids from the mother liquors obtained from the last four stages of the third cycle described above, in the order obtained, mixed with, respectively, 253, 249, 202 and 163 milliliters of fresh solvent, and finally, with 99.5 milliliters of fresh solvent. There was thus obtained 7.24 grams of sterols assaying 85.6 percent stigmasterol, representing a 55.5 percent recovery of the 11.1 grams of stigmasterol present in the 41 gram portion of feed solids employed in that cycle.

EXAMPLE 4

*Batchwise countercurrent extraction with five enriching stages and two stripping stages*

The following three cycles are taken from a batchwise countercurrent extraction employing five enriching stages and two stripping stages. In this extraction, 41 gram portions of soysterols, cleaned up as described hereinbefore, assaying 27 percent stigmasterol were used as feed solids and mixed with the stripped sterols obtained from the first stripping stage of a preceding cycle. For convenience, the stripped sterols from one cycle were not reintroduced into the system at the first enriching stage of the next cycle but were reintroduced three cycles later at the first enriching stage. The solvent employed was a 50:50 mixture (by volume) of ethylene dichloride and n-heptane.

In the stripping stages of each cycle, a portion of the solids was precipitated from the mother liquor obtained from the first enriching stage of that cycle, in the manner described in Example 3, and the thus-precipitated sterols introduced into the system as described above. In the second stripping stage, the mother liquor remaining from the first stripping stage was stripped of a portion of the dissolved solids remaining, in the same manner as described in Example 3, but employing less solvent and water, and the portion of the sterols which precipitated was mixed with the mother liquor solids entering the first stripping stage of the third cycle following.

In the enriching stages, the ratio of undissolved stigmasterol to dissolved stigmasterol ($E_s$) was maintained at about 1.7.

In the first cycle, a 41 gram portion of feed sterols was mixed with 33.3 grams of sterols assaying 23.2 percent stigmasterol obtained from the first stripping stage of the third preceding cycle and the mixture extracted five successive times, first, with the solids from the mother liquors obtained from the last four stages of the preceding cycle, in the order obtained, mixed with, respectively, 354, 315, 263 and 254 milliliters of fresh solvent, and finally with 131 milliliters of fresh solvent. The first of the solids from these mother liquors weighed 53.3 grams and assayed nineteen percent stigmasterol; the second, 35.3 grams and assayed 24.4 percent; the third, 18.1 grams and assayed 36.4 percent; and the fourth, 9.39 grams and assayed 44.3 percent. There was thus obtained 8.67 grams of sterols assaying 85.2 percent stigmasterol, representing a 65.9 percent recovery of the 11.1 grams of stigmasterol present in the feed stock employed in that cycle.

In the second cycle, a 41 gram portion of feed sterols was mixed with 31.95 grams of sterols assaying 26.1 percent stigmasterol obtained from the first stripping stage of the third preceding cycle and the mixture extracted five successive times, first, with the solids from the mother liquors obtained from the last four stages of the first cycle described above, in the order obtained, mixed with, respectively, 348, 324, 262 and 250 milliliters of fresh solvent, and finally, with 124 milliliters of fresh solvent. There was thus obtained 8.61 grams of sterols assaying 88.8 percent stigmasterol, representing a 68.2 percent recovery of the stigmasterol.

In the third cycle, a 41 gram portion of feed sterols was mixed with 34.6 grams of sterols assaying 24.4 percent stigmasterol obtained from the first stripping stage of the third preceding cycle and the mixture extracted five successive times, first, with the solids from the mother liquors obtained from the last four stages of the first cycle described above, in the order obtained, mixed with, respectively, 348, 327, 260 and 254 milliliters of fresh solvent, and finally with 133 milliliters of fresh solvent. Thre was thus obtained 8.53 grams of sterols assaying 86.5 percent stigmasterol, representing a 65.8 percent recovery of the stigmasterol.

EXAMPLE 5

*Batchwise countercurrent extraction*

Following the procedure of the preceding examples using mixtures of n-heptane and ethylene dichloride, especially the azeotrope of n-heptane and ethylene dichloride consisting of approximately 37 percent n-heptane and 63 percent ethylene dichloride by volume, is productive of similarly satisfactory recoveries and quality of stigmasterol.

This application is a continuation-in-part of our prior-filed copending application Serial No. 461,637, filed October 11, 1954, now abandoned.

It is to be understood that the invention is not to be limited to the exact details of operation shown and described, as obvious modifications and equivalents will be apparent to one skilled in the art, and the invention is therefore to be limited only by the scope of the appended claims.

We claim:

1. A process for the separation and purification of stigmasterol and sitosterols by the extraction of sitosterols from a starting solid stigmasterol and sitosterols mixture consisting essentially of stigmasterol and sitosterols, which comprises contacting the starting solid stigmasterol and sitosterols mixture with a selective organic solvent having the following characteristics: (1) a greater solvent affinity for the sitosterols as determined on a test portion of said starting solid stigmasterol and sitosterols mixture by employing a volume of the organic solvent which dissolves approximately one-half of the solids of the test portion of the said starting solid stigmasterol and sitosterols mixture, and (2) a relative distribution coefficient ($\beta$) in said test greater than 1.5, said relative distribution coefficient ($\beta$) being determined according to the formula:

$$\beta = \frac{S_c \times NS_{ml}}{NS_c \times S_{ml}}$$

wherein $S_c$ is the stigmasterol content in percent of the undissolved solids, $NS_c$ is the non-stigmasterol content in percent of the undissolved solids (by difference), $S_{ml}$ is the stigmasterol content in percent of the dissolved solids in the mother liquor, and $NS_{ml}$ is the non-stigmasterol content in percent of the dissolved solids in the mother liquor (by difference), to cause selective extraction of the sitosterols from the stigmasterol, separating the solid material phase which is enriched in stigmasterol content from the organic solvent phase which is enriched in sitosterols content, and continuing the extraction process in a countercurrent manner.

2. A process for the enrichment in stigmasterol content of a solid mixture of sterols consisting essentially of sitosterols and stigmasterol by a countercurrent selective extraction which comprises converting each batch of starting sterol mixture into at least four successive slurries by contact in countercurrent manner with at least four successive volumes of a selective organic solvent having the following characteristics: (1) a greater solvent affinity for the sitosterols as determined on a test portion of said starting solid stigmasterol and sitosterols mixture by employing a volume of the organic solvent which dissolves approximately one-half of the solids of the test portion of the said starting solid stigmasterol and sitosterols mixture, and (2) a relative distribution coefficient ($\beta$) in said test greater than 1.5, said relative distribution coefficient ($\beta$) being determined according to the formula:

$$\beta = \frac{S_c \times NS_{ml}}{NS_c \times S_{ml}}$$

wherein $S_c$ is the stigmasterol content in percent of the undissolved solids, $NS_c$ is the non-stigmasterol content in percent of the undissolved solids (by difference), $S_{ml}$ is the stigmasterol content in percent of the dissolved solids in the mother liquor, and $NS_{ml}$ is the non-stigmasterol content in percent of the dissolved solids in the mother liquor (by difference); maintaining the volume of solvent and temperature so that more than fifty percent of the stigmasterol in each slurry remains in an undissolved state ($E_s = >1$) and more than fifty percent of the sitosterols in each slurry is in a dissolved state ($E_s/\beta = <1$); and separating the solid material phase which is enriched in stigmasterol content from the organic solvent phase which is enriched in sitosterols content.

3. The process of claim 2 wherein the starting sterol mixture contains from five to 35 percent stigmasterol.

4. The process of claim 2 wherein between 55 and 85 percent of the stigmasterol in each slurry is undissolved.

5. A countercurrent selective extraction of a solid sterol mixture consisting essentially of sitosterols and at least five percent stigmasterol which comprises extracting portions of said solid mixture at least four times each in a countercurrent manner with successive portions of a selective organic solvent having the following characteristics; (1) a greater solvent affinity for the sitosterols as determined on a test portion of said starting solid stigmasterol and sitosterols mixture by employing a volume of the organic solvent which dissolves approximately one-half of the solids of the test portion of the said starting solid stigmasterol and sitosterols mixture, and (2) a relative distribution coefficient ($\beta$) in said test greater than 1.5, said relative distribution coefficient ($\beta$) being determined according to the formula:

$$\beta = \frac{S_c \times NS_{ml}}{NS_c \times S_{ml}}$$

wherein $S_c$ is the stigmasterol content in percent of the undissolved solids, $NS_c$ is the non-stigmasterol content in percent of the undissolved solids (by difference), $S_{ml}$ is the stigmasterol content in percent of the dissolved solids in the mother liquor and $NS_{ml}$ is the non-stigmasterol content in percent of the dissolved solids in the mother liquor (by difference), maintaining the volume of solvent and temperature so that more than fifty percent of the stigmasterol in each slurry remains in an undissolved state ($E_s = >1$) and more than fifty percent of the sitosterols in each slurry is in a dissolved state ($E_s/\beta = <1$) and maintaining the proportion of undissolved to dissolved stigmasterol in each slurry at least 1.5 times the proportion of undissolved to dissolved sitosterols by use of a solvent having a relatively high $\beta$ value above 1.5 in each equilibration; and separating the thus-purified stigmasterol from the organic solvent phase.

6. The process of claim 5 wherein the organic solvent includes ethylene dichloride.

7. The process of claim 5 wherein a portion of the stigmasterol dissolved in the mother liquor obtained from the first extraction of each of said solid portions is stripped from the mother liquor by precipitation of a portion of the sterols dissolved therein and the precipitated sterols then combined and extracted with a succeeding fresh solid portion in a succeeding cycle of the process.

8. A countercurrent selective extraction of a solid sterol mixture consisting essentially of sitosterols and at least five percent stigmasterol which comprises extracting solid portions of the mixture at least four times each in a countercurrent manner with successive portions of a selective organic solvent having the following characteristics; (1) a greater solvent affinity for the sitosterols as determined on a test portion of said starting solid stigmasterol and sitosterols mixture by employing a volume of the organic solvent which dissolves approximately one-half of the solids of the test portion of the said starting solid stigmasterol and sitosterols mixture, and (2) a relative distribution coefficient ($\beta$) in said test greater than 1.5, said relative distribution coefficient ($\beta$) being determined according to the formula:

$$\beta = \frac{S_c \times NS_{ml}}{NS_c \times S_{ml}}$$

wherein $S_c$ is the stigmasterol content in percent of the undissolved solids, $NS_c$ is the non-stigmasterol content in percent of the undissolved solids (by difference), $S_{ml}$ is the stigmasterol content in percent of the dissolved solids in the mother liquor and $NS_{ml}$ is the non-stigmasterol content in percent of the dissolved solids in the mother liquor (by difference), each successive portion of the organic solvent containing dissolved sterols of increased stigmasterol content over the preceding portion, the volume of solvent and temperature being maintained so that the undissolved solids remaining after an extraction with that portion of organic solvent contain between about 1.2 and six times the stigmasterol dissolved in the mother liquor after the extraction ($E_s = >1.2$) and more than fifty percent of the sitosterols in each slurry are in a dissolved state ($E_s/\beta = <1$); and separating the solid material phase which is enriched in stigmasterol content from the organic solvent phase which is enriched in sitosterols content.

9. The process of claim 8 wherein the organic solvent comprises ethylene dichloride.

10. The process of claim 8 wherein the organic solvent is a mixture of ethylene dichloride and n-heptane.

11. The process of claim 8 wherein the organic solvent is the azeotropic mixture of ethylene dichloride and n-heptane.

12. The process of claim 8 wherein a portion of the sterols, comprising from 35 to eighty percent of the stigmasterol, dissolved in the mother liquor obtained from the first extraction of each said solid portions is stripped from the mother liquor by precipitation of a portion of the sterols dissolved therein and the precipitated sterols are then combined and extracted with a succeeding fresh solid portion in a succeeding cycle of the process.

13. A countercurrent selective extraction of a solid sterol mixture consisting essentially of soysterols containing between about fifteen and about 35 percent stigmasterol which comprises extracting solid portions of the soysterols at least four times each in a countercurrent manner with successive portions of a solvent mixture of ethylene dichloride and n-heptane, each successive portion of said solvent mixture containing dissolved soysterols of increased stigmasterol content over the preceding portion and being of such a volume at the temperature employed that the undissolved solids remaining after an extraction with that portion of said solvent mixture contains from about 1.2 to about three times the stigmasterol dissolved in the mother liquor after the extraction ($E_s = 1.2-3$) and that more than fifty percent of the sitosterols remain dissolved ($E_s/\beta = <1$); stripping a portion of the soysterols from the mother liquor obtained from the first extraction of each of said solid portions, comprising from about fifty to about seventy percent of the stigmasterol dissolved in the mother liquor, while maintaining more than fifty percent of the sitosterols in solution in the mother liquor, and then combining and extracting the stripped soysterols with another said solid portion; and isolating the residual thus-purified stigmasterol.

14. The process of claim 13 wherein the extractions are performed at a temperature between fifteen and 45 degrees centigrade.

15. The process of claim 13 wherein the mixture of ethylene dichloride and n-heptane is their azeotropic mixture.

16. The process of claim 13, wherein the soysterols are stripped from the mother liquor by precipitation therefrom.

17. The process of claim 13 wherein the mother liquor, remaining after the first stripping operation, is stripped of a portion of the soysterols comprising from about fifty to about seventy percent of the stigmasterol contained therein, and the stripped soysterols are combined with the mother liquor obtained from the first extraction of another said solid portion.

18. The process of claim 17 wherein the mother liquor, remaining after the second stripping operation, is stripped of a portion of the soysterols comprising from about fifty to about seventy percent of the stigmasterol contained therein, and the stripped soysterols are combined with the mother liquor obtained from a first stripping stage.

References Cited in the file of this patent

UNITED STATES PATENTS

| | | |
|---|---|---|
| 2,508,220 | Buxton | May 16, 1950 |
| 2,772,297 | Lacquer | Nov. 27, 1956 |